US011079236B2

(12) United States Patent
Merfels et al.

(10) Patent No.: US 11,079,236 B2
(45) Date of Patent: Aug. 3, 2021

(54) ESTIMATION OF AN INDIVIDUAL POSITION

(71) Applicant: Volkswagen Aktiengesellschaft, Wolfsburg (DE)

(72) Inventors: Christian Merfels, Braunschweig (DE); Thorsten Hehn, Wolfsburg (DE); Marcel Geppert, Freiburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 232 days.

(21) Appl. No.: 16/349,032

(22) PCT Filed: Nov. 9, 2017

(86) PCT No.: PCT/EP2017/078814
§ 371 (c)(1),
(2) Date: May 10, 2019

(87) PCT Pub. No.: WO2018/087257
PCT Pub. Date: May 17, 2018

(65) Prior Publication Data
US 2019/0265041 A1   Aug. 29, 2019

(30) Foreign Application Priority Data

Nov. 14, 2016   (DE) ...................... 10 2016 222 272.4

(51) Int. Cl.
*G01S 19/49*   (2010.01)
*G01C 21/16*   (2006.01)
(Continued)

(52) U.S. Cl.
CPC .......... *G01C 21/165* (2013.01); *G01S 7/4808* (2013.01); *G01S 13/86* (2013.01);
(Continued)

(58) Field of Classification Search
CPC ...... G01C 21/165; G01C 21/26; G01C 21/16; G01S 19/41; G01S 17/931; G01S 19/48; G01S 13/931; G01S 17/86
(Continued)

(56) References Cited

U.S. PATENT DOCUMENTS 5,774,829 A * 6/1998 Cisneros ................. G01S 19/31
701/475
5,923,286 A * 7/1999 Divakaruni ............. G01S 19/20
342/357.44
(Continued)

FOREIGN PATENT DOCUMENTS

EP   1770364 B1 *  4/2017 ............. G01C 21/16
EP   3538843 A1 *  9/2019 ............ G01S 17/931
JP   5046601 B2 * 10/2012 ............. G01C 21/26

OTHER PUBLICATIONS

Escher A C et al., "GPS/IRS Hybridization: Definition of Exclusion Radius Using Solution Seperation Method"; a presentation at IFIS 2002, Roma. (Year: 2002).*
(Continued)

*Primary Examiner* — Cuong H Nguyen
(74) *Attorney, Agent, or Firm* — Slayden Grubert Beard PLLC

(57) ABSTRACT

The present invention relates to a method for estimating an individual position. In order to improve the estimation of the individual position of a vehicle, for example, at least one first position measurement is carried out by a first positioning system and at least one second position measurement is carried out by at least one second positioning system. A third position measurement is also carried out by the first positioning system. The third position measurement is carried out after the first and second position measurements. The individual position is estimated on the basis of at least the third position measurement and at least one position error
(Continued)

value. The position error value is determined on the basis of the at least one first position measurement and the at least one second position measurement.

8 Claims, 2 Drawing Sheets

(51) Int. Cl.
| | |
|---|---|
| G01S 13/86 | (2006.01) |
| G01S 19/41 | (2010.01) |
| G01S 13/931 | (2020.01) |
| G01S 19/48 | (2010.01) |
| G01S 19/40 | (2010.01) |
| G01S 7/48 | (2006.01) |
| G01S 17/86 | (2020.01) |
| G01S 17/931 | (2020.01) |

(52) U.S. Cl.
CPC .......... *G01S 13/931* (2013.01); *G01S 17/86* (2020.01); *G01S 17/931* (2020.01); *G01S 19/40* (2013.01); *G01S 19/41* (2013.01); *G01S 19/48* (2013.01); *G01S 19/49* (2013.01)

(58) Field of Classification Search
USPC .................. 701/410, 470–471, 473, 469, 505
See application file for complete search history.

(56) References Cited

U.S. PATENT DOCUMENTS

| | | | | |
|---|---|---|---|---|
| 6,826,478 B2* | 11/2004 | Riewe | ................. | G01C 21/165 |
| | | | | 701/470 |
| 7,715,783 B2* | 5/2010 | Girard | ................. | H01Q 21/061 |
| | | | | 455/3.02 |
| 7,848,881 B2* | 12/2010 | Tan | ................. | G06Q 10/08 |
| | | | | 701/469 |
| 8,073,619 B2* | 12/2011 | Hattori | ................. | G01S 19/40 |
| | | | | 701/445 |
| 8,165,728 B2* | 4/2012 | Schultz | ................. | G01S 19/40 |
| | | | | 701/2 |
| 8,204,432 B2* | 6/2012 | Girard | ................. | H01Q 1/28 |
| | | | | 455/3.02 |
| 8,718,935 B2* | 5/2014 | Miller | ................. | G01C 25/005 |
| | | | | 701/469 |
| 8,756,001 B2* | 6/2014 | Georgy | ................. | G01S 19/47 |
| | | | | 701/408 |
| 8,843,314 B2* | 9/2014 | Sun | ................. | G01C 21/00 |
| | | | | 701/472 |
| 8,862,394 B2* | 10/2014 | Taylor, Jr. | ................. | G01C 21/16 |
| | | | | 701/470 |
| 8,965,604 B2* | 2/2015 | Nandedkar | ................. | B61L 25/026 |
| | | | | 701/19 |
| 9,091,549 B2* | 7/2015 | Taylor, Jr. | ................. | G01C 21/16 |
| 9,271,258 B2* | 2/2016 | Taylor, Jr. | ................. | G01S 11/08 |
| 9,593,963 B2* | 3/2017 | Guillet | ................. | G08G 5/0021 |
| 9,612,325 B2* | 4/2017 | Taylor, Jr. | ................. | G01S 13/84 |
| 9,927,530 B2* | 3/2018 | Boyarski | ................. | G01C 21/16 |
| 9,945,100 B2* | 4/2018 | Friend | ................. | E02F 9/205 |
| 9,964,949 B2* | 5/2018 | Hay | ................. | B60W 50/00 |
| 10,094,908 B2* | 10/2018 | Taylor, Jr. | ................. | G01S 5/0226 |
| 2008/0033645 A1* | 2/2008 | Levinson | ................. | G01C 21/20 |
| | | | | 701/469 |
| 2008/0077326 A1* | 3/2008 | Funk | ................. | G08B 25/016 |
| | | | | 701/500 |
| 2010/0169006 A1* | 7/2010 | Ueda | ................. | G01C 21/28 |
| | | | | 701/505 |
| 2011/0238308 A1* | 9/2011 | Miller | ................. | G01S 19/31 |
| | | | | 701/472 |
| 2014/0129136 A1* | 5/2014 | Celia | ................. | G01C 21/16 |
| | | | | 701/445 |
| 2014/0203971 A1* | 7/2014 | Taylor, Jr. | ................. | G01C 21/206 |
| | | | | 342/458 |
| 2014/0207374 A1* | 7/2014 | Taylor, Jr. | ................. | G01C 21/206 |
| | | | | 701/470 |
| 2015/0253150 A1* | 9/2015 | Guillet | ................. | G08G 5/025 |
| | | | | 701/480 |
| 2019/0265041 A1* | 8/2019 | Merfels | ................. | G01S 17/86 |

OTHER PUBLICATIONS

Ground control for the geometric correction of PAN imagery from Indian remote sensing (IRS) satellites; S.K. Katiyar;O. Dikshit; Krishna Kumar; IGARSS 2003. 2003 IEEE International Geoscience and Remote Sensing Symposium. Proceedings (IEEE Cat. No. 03CH37477); vol. 6 IEEE Conference Paper. (Year: 2003).*

The study on SAR images exploitation for air platform navigation purposes; M. Greco;G. Pinelli;K. Kulpa;P. Samczynski;B. Querry;S. Querry; 2011 12th International Radar Symposium (IRS); IEEE Conference Paper. (Year: 2011).*

Mitigation of leverage observation effects in GNSS robust positioning; Antonio Angrisano;Salvatore Gaglione; 2018 IEEE International Workshop on Metrology for the Sea; Learning to Measure Sea Health Parameters (MetroSea); IEEE Conference Paper. (Year: 2018).*

OmimamoriNet: An Outdoor Positioning System Based on Wi-SUN FAN Network; Yin Chen;Mina Sakamura;Jin Nakazawa;Takuro Yonezawa;Akira Tsuge;Yuichi Hamada; 2018 Eleventh International Conference on Mobile Computing and Ubiquitous Network (ICMU); IEEE Conference Paper. (Year: 2018).*

Adaptive Cooperative Localization Using Relative Position Estimation for Networked Systems With Minimum Number of Communication Links; Ali Safaei; Muhammad Nasiruddin Mahyuddin; IEEE Access; vol. 7, IEEE Journal Article. (Year: 2019).*

Agent-based modeling to simulate road travel using Big Data from smartphone GPS: An application to the continental United States; Sashikanth Gurram et al; 2019 IEEE International Conference on Big Data (Big Data); Year: 2019; IEEE Conference Paper. (Year: 2019).*

* cited by examiner

ESTIMATION OF AN INDIVIDUAL POSITION

CROSS-REFERENCE TO RELATED APPLICATIONS

This application claims priority to German Patent Application No. DE 10 2016 222 272.4, filed on Nov. 14, 2016 with the German Patent and Trademark Office. The contents of which application are incorporated herein for all purposes.

TECHNICAL FIELD

The present invention relates to a device and a method for estimating an individual position, in particular for estimating an individual position of a vehicle.

BACKGROUND

A determination or estimation of an individual position of a vehicle is used in many vehicles in order to help a driver of the vehicle in reaching a target location with the assistance of a navigation system. The vehicle can for example be a passenger car, a commercial vehicle, a ship or an airplane, or any land vehicle, watercraft or aircraft. The individual position of the vehicle can for example be precisely determined within a few meters using a global satellite navigation system such as GPS. Such a precision is generally sufficient for positioning with the assistance of a navigation system, although a higher precision offers advantages. For example, lane selection can be assisted and checked with greater precision, or turning can be displayed more precisely. Consequently, data from a global satellite navigation system are normally combined with, for example, odometry data of the vehicle by means of data fusion in order to increase the precision of determining or estimating the individual position.

Another use for determining or estimating the individual position is in automated motor vehicle guidance. For automated driving functions, highly-precise self localization of the vehicle is an important task in order, for example, to be able to determine distances to the edge of the road, to other vehicles, or to objects in the surroundings.

DE 69034047 T2 for example relates to an integrated vehicle positioning and navigation system. A computer-based system for autonomous navigation of a vehicle along a predetermined path has first means for determining a location of the vehicle, and second means in order to cause the vehicle to follow the predetermined path. The first means comprise a first position determining system that is suitable for determining a first estimation of the position of the vehicle based on first signals from a terrestrial position determining system. The first means moreover comprise a second position determining system in order to perform a second estimation of the position of the vehicle based on second signals that are obtained from an inertial reference unit and a vehicle tachometer. Finally, the first means comprise a processing system in order to determine a third estimation of the position of the vehicle from a weighted combination of the first position estimation and the second position estimation. The system furthermore has third means in order to cause the vehicle to detect and avoid obstacles while it follows the predetermined path.

In a combination of position estimations by different positioning systems, it can be expedient to take into account potential positioning errors by the different positioning systems.

In this context, EP 0161688 A2 discloses a navigation method for vehicles. A navigation system receives signals from both vehicle sensors as well as from additional entry means. The vehicle's sensors comprise sensors such as route and motion sensors or position sensors. The additional means of entry are for example manual entries of the location, or receiving apparatuses for radio or satellite navigation methods such as GPS. Deterministic route and speed errors such as stochastic route error components and stochastic vehicle longitudinal movement error components are compensated with the assistance of a Kalman filter. The errors arising when fixing position (by for example GPS) are mathematically modeled under the assumption that they can be described by Gaussian white noise, i.e., normally distributed uncorrelated noise.

Frequently, instances occur in practice, however, in which position measurements by positioning systems such as global satellite navigation systems manifest an autocorrelated error.

SUMMARY

An object of the present invention is to compensate for autocorrelated errors of position measurements when determining an individual position.

This object is solved by a method for estimating an individual position and a corresponding device according to the independent claims. The dependent claims and the following discussion disclose embodiments of the invention.

DETAILED DESCRIPTION

Figure 1:
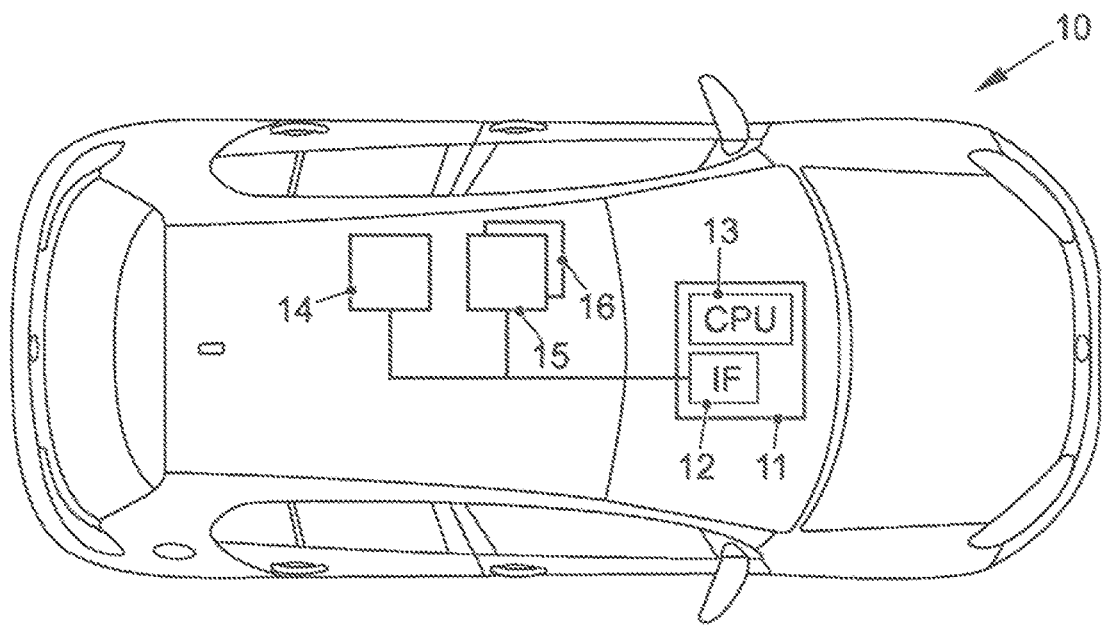
FIG. 1 schematically shows a vehicle with a device according to an embodiment.

According to a first aspect, a method is provided for estimating an individual position. In the method, at least one first position measurement is provided by a first positioning system, and at least one second position measurement is provided by at least one second positioning system. Moreover, a third position measurement is provided by the first positioning system. The third position measurement is carried out after the first and the at least one second position measurement. The individual position is estimated on the basis of at least the third position measurement and at least one position error value. The position error value is determined on the basis of the at least one first position measurement and the at least one second position measurement.

Expressed otherwise, a first positioning system and at least one second positioning system are available. Both positioning systems provide for example continuous position measurements. The position error value is determined on the basis of previous position measurements (of the at least one first position measurement) of the first positioning system, and previous position measurements (of the at least one second position measurement) of the at least one second positioning system. A current position measurement (the third position measurement) is used by the first positioning system in conjunction with the position error value to estimate the individual position. In doing so, the current position measurement is corrected by the position error value.

This can yield the following benefit. Measuring errors of many positioning systems also have features that are autocorrelated over time in addition to a random measuring error distribution (white noise). The features of two different positioning systems that are autocorrelated over time are generally different, however, so that the position error value has a different autocorrelated feature than the position measurements from the first positioning system. This can reduce the influence of the autocorrelation; a so-called decorrelation occurs. In particular in the instance in which the position measurements from the second positioning system do not have any autocorrelated features, influence by the autocorrelation can be significantly reduced in the measuring errors from the first positioning system. Depending on the autocorrelation features of the first positioning system, a plurality of position error values can be used when estimating the individual position to correct to the position measurement (the third position measurement). A respective position error value can for example be determined on the basis of corresponding previous first and second position measurements.

According to one embodiment, a respective position error value of the at least one position error value is determined as a differential value between a first position measurement of the at least one first position measurement, and a second position measurement of the at least one second position measurement. For example, a first position measurement and a second position measurement can occur at three points in time. A position error is determined for the first point in time as a difference between the first position measurement and the second position measurement at the respective first point in time. A position error value is determined for the second point in time as a difference between the first position measurement at the second point in time, and the second position measurement at the second point in time. A position error value is accordingly determined for the third point in time as a difference between the first and the second position measurement at the respective third point in time. Depending on the autocorrelation feature of the position measurements from the first positioning system, a suitable number of position error values can be easily provided and used to correct the current position measurement.

For example, an autocorrelation order A can be provided for position measurements by the first positioning system. The individual position is estimated on the basis of at least the third position measurement and A position error values. The A position error values are determined on the basis of A first position measurements, and A second position measurements. The autocorrelation order A can be determined beforehand founded on a corresponding autocorrelation model, for example by reference position measurements, i.e., off-line. Alternatively, it is also possible to determine the autocorrelation order A online. Using the autocorrelation order A, the number of required position error values can be determined, for example. For example, three position error values in each case can be taken into account when estimating the individual position for an autocorrelation order of three. By determining the autocorrelation order, a suitable number of required position error values can be easily established in order to enable a suitable correction and hence estimation of the individual position.

For example, with the assistance of the autocorrelation model, corresponding autocorrelation coefficients can moreover be provided that are moreover taken into account in estimating the individual position. According to the order A, a corresponding number of A autocorrelation coefficients can be provided, and the individual position can be estimated on the basis of additionally these A autocorrelation coefficients. In the above example in which three position error values were taken into account in estimating the individual position, the autocorrelation order can for example be three, and three additional autocorrelation coefficients can accordingly be taken into account.

According to one embodiment, the individual position is estimated according to the following equation:

$$c_i^a = z_i^a - \sum_{j=1}^{A} \gamma_j (z_{i-j}^a - z_{i-j}^w)$$

In this case, $c_i^a$ describes the individual position, and i describes different points in time for position measurements. Position measurements by the first positioning system are designated $z^a$, and measurements with the second positioning system are designated $z^w$. The current point in time is for example the point in time i, and accordingly the preceding past points in time result at i–j, with a j that is counted from 1 up to the autocorrelation order A. According to the above definition, the third position measurement, i.e., the current position measurement by the first positioning system, is designated $z_i^a$. The first position measurements at the previous points in time i–1 to i–A are designated $z_{i-j}^a$. The second position measurements at the previous points in time i–1 to i–A are designated $z_{i-j}^w$. Yj with j=1 to A designates the A autocorrelation coefficients.

The calculation operations for the above equation can be carried out using comparatively easy means of calculation within a short time so that the individual position can be quickly and easily determined. Even when the autocorrelation order A increases, the complexity of the calculation only increases linearly.

According to one embodiment, the at least one first position measurement, the at least one second position measurement and the third position measurement each comprise absolute position measurements. Absolute position measurements indicate an absolute geographic position, for example in the form of degrees of longitude and latitude, as well as optionally height information. Corresponding first and second positioning systems can for example comprise satellite-supported global positioning systems or terrestrially supported global positioning systems such as positioning systems that are based on mobile telecommunications systems. Additional positioning systems that provide absolute position measurements can for example be camera-based, laser-based, radar-based or ultrasound-based positioning systems which, in conjunction with detailed map material or environmental material, determine a position by comparing detected environmental information with the map material or environmental material.

According to another embodiment, the at least one first position measurement, the at least one second position measurement and the third position measurement each comprise relative position measurements. Relative position measurements signify relative geographic positions with reference to a respective previous position measurement. Relative position measurements can for example be recorded with the assistance of vehicle sensors that ascertain a movement of the vehicle. Such sensors are also called odometry sensors. Odometry sensors comprise for example speed sensors, acceleration sensors and steering angle sensors. Relative position measurements can moreover be founded on camera-based, laser-based, radar-based or ultrasound-based systems in that a relative change in position of the vehicle to the environment is determined with the assistance of the systems.

The above method can therefore be used equally for positioning systems that display absolute geographic positions as well as for positioning systems that display relative geographic positions. As can be seen from the above equation, position measurements from positioning systems of the same class may be easily combined with each other. Expressed otherwise, the above-described method is particularly suitable for combining only absolute position measurements with each other, or only relative position measurements with each other.

According to another aspect, the individual position is estimated using Q position-determining sources. Q in this case is at least three, i.e., at least three different position-determining sources are available. A respective preliminary individual position is estimated for each k of 1 to Q using the above-described method. Accordingly, Q preliminary individual positions are estimated. The position-determining source k is used in this case as the first positioning system in the above-described method. The other position-determining sources, i.e., the position-determining sources from 1 to Q without k are used as the at least one second positioning system. Each position measurement of the at least one second position measurement is determined by combining position measurements from position-determining sources 1 to Q without k.

The Q preliminary individual positions are accordingly determined by using one of the position-determining sources as the first positioning system, and the other position-determining sources as the second positioning system. In doing so, the position-determining sources are interchanged such that each position-determining source is used once as the first positioning system. Q preliminary individual positions result that are combined into the final individual position. Consequently, the above-described method can also be used with more than two position-determining sources. The preliminary individual positions are therefore based in principle on a decorrelation of the position measurement from a position-determining source using position measurements from the other position-determining sources. Accordingly, each position measurement from the different position-determining sources is decorrelated once using the other position-determining sources, and the preliminary individual positions decorrelated in this manner are combined into the final individual position.

According to another aspect, a device is provided that comprises an interface and at least one processor. The interface is capable of receiving position measurements from one first positioning system and position measurements from at least one second positioning system. The processor is designed to perform the following steps. Initially, the processor provides at least one first position measurement from the first positioning system.

Moreover, the processor provides at least one second position measurement from the at least second positioning system. A third position measurement is provided from the processor based on the first positioning system. The third position measurement is carried out after the first and second position measurements. The individual position is estimated by the processor on the basis of at least the third position measurement and at least one position error value. The position error value is determined by the processor on the basis of the at least one first position measurement and the at least one second position measurement. The at least one first position measurement can comprise a plurality of position measurements that occurred sequentially before the third position measurement. Likewise, the at least one second position measurement can comprise a plurality of position measurements that occurred sequentially before the third position measurement. The first position measurements and the second position measurements in some embodiments are recorded at nearly the same points in time, i.e., in pairs. Corresponding position error values can be determined from corresponding pairs of first and second position measurements.

The device may moreover be designed for performing the above-described method, and therefore also comprises the advantages described in conjunction with the method.

In the above description, embodiments were described independent of each other. The embodiments may however be combined with each other as desired.

The present invention is described in the following using further embodiments with reference to the FIGS.

FIG. 1 shows a vehicle 10 with a device 11 that is capable of estimating an individual position of the vehicle 10. The device 11 comprises an interface (IF) 12 and a processor (CPU) 13. By means of the interface 12, the device 11 is coupled to a first positioning system 14 and a plurality of second positioning systems 15, 16 of the vehicle 10. The number of the second positioning systems is arbitrary; there is, however, at least one second positioning system 15 or 16.

The positioning systems 14-16 may in particular comprise so-called absolute positioning systems that supply an absolute position measurement, for example in the form of degrees of longitude, latitude and optionally height information. Such positioning systems 14-16 may for example comprise satellite-supported global position determining systems such as GPS or Galileo. Alternatively or in addition, absolute positioning systems may comprise optical camera systems, laser sensors, lidar sensors, radar sensors, or ultrasound sensors by means of which a two or three-dimensional image of the vehicle environment is recorded. In the image of the environment, features are extracted such as lanes or depth contours. These features are compared with the features that are saved in detailed map data. The map data additionally comprise global position information on these features and, on the basis of the comparison, a relative position of the vehicle to these features, and hence a global position of the vehicle, may be determined on the basis of this sensor data.

Each position determination by the positioning systems 14-16 normally has a certain imprecision or a certain error. These imprecisions or errors may be caused by recording data, such as by the reception of GPS signals or laser signals, or by further processing such as filtering of GPS signals, or methods of comparing detected environmental features with environmental features from maps. In the following, methods will therefore be described that reduce such errors. In this context, it should be noted that position measurements from different positioning systems will be used. Two positioning systems may for example differ in that they are based on different information, for example on information from a laser sensor and on information from a GPS receiver. It is however also possible for two positioning systems to differ in that they process the same information in different ways. For example, information from a GPS receiver may be processed by different filtering methods and thus represent position measurements from different positioning systems within the meaning of this discussion. Likewise, GPS signals for example may be received at two different locations on the vehicle and accordingly represent two different positioning systems. Finally, relative position measurements may be used by corresponding positioning systems alternatively to absolute position measurements. Relative position measurements may for example be provided by odometry sensors of the vehicle, for example from a steering angle sensor, a speed sensor and/or an acceleration sensor. However, only positioning systems of one class will be used in the exemplary methods described below, i.e., only absolute positioning systems or only relative positioning systems.

Before the method of the present embodiment is addressed in detail, first the basic problem of the combination, a so-called fusion, of position measurements will be described.

In order to improve the precision and reliability of an individual position estimation, there are a plurality of positioning systems that supply position measurements in vehicles with automated driving functions. These position measurements are associated with ambiguities. In a fusion of position measurements, frequently the assumption is made that the measuring error for the i-th position measurement $z_i^w$ may be described by white noise. A measurement with whitenoise $z_i^w$ is assumed to be $$z_i^w = p_i + e_i^w \quad (1)$$

wherein $p_i$ is the true position for the i-th measurement, and $e_i^w$ is the measuring error of the i-th position measurement. In this case, $e_i^w = v_i^w$ with $v_i^w \sim N(0, \Sigma_i^w)$ modelled as white noise. A covariance matrix $$\Sigma_i^w = \begin{bmatrix} \text{Cov}(z_{i,1}^w, z_{i,1}^w) & \cdots & \text{Cov}(z_{i,1}^w, z_{i,d}^w) \\ \vdots & \ddots & \vdots \\ \text{Cov}(z_{i,d}^w, z_{i,1}^w) & \cdots & \text{Cov}(z_{i,d}^w, z_{i,d}^w) \end{bmatrix} \quad (2)$$

designates the spatial measuring inaccuracy, $z_{i,d}^w$ designates the d-th vector entry (for example a two dimensional vector in the X and Y direction, or a three-dimensional vector in the X, Y and Z direction) of the i-th position measurement, and $\text{Cov}(\cdot, \cdot)$ designates the covariance of the two functional arguments.

In practice, however, incidences frequently occur in which the measuring error also depends on the preceding measuring errors, i.e., there is an autocorrelation. In this case, the following holds true for a measurement $z_i^a$ with an autocorrelated error:

$$z_i^a = p_i + e_i^a \quad (3)$$

wherein $e_i^a$ may be described by a discrete autocorrelation of the order A as $$e_i^a = \sum_{j=1}^{A} \gamma_j e_{i-j}^a + v_i^a \quad (4).$$

In this case, $v_i^a \sim N(0, \Sigma_i^a)$ and $\gamma_j$ designate the j-th autocorrelation coefficient. Overall, the error of the i-th position measurement correlates not just with the i-th measurement, but also with the previous A position errors. In practice, such an error is for example observable with GPS signals when for example the contained errors depend on environmental factors that are constant over short time periods. Likewise, the preliminary processing of the signal (such as filtering with a Kalman filter) included in many sensors may artificially generate such an error model.

As already mentioned, frequently the assumption is made in a data fusion that the errors in position measurements may be modeled as in equation (1). A method is therefore desirable for improving position measurements as in equation (3) such that this assumption is more applicable. This improvement therefore forms an "error decorrelation" of the position measurements. If autocorrelated error components are not taken into account and only white noise is assumed, this may in particular lead to misestimations or to an excessively low estimation of uncertainty, in particular when there are estimation or optimization problems.

In the following, a method will therefore be described that enables such an error decorrelation of position measurements of the type $z^a$ taking into account position measurements of the type $z^w$ (without knowing the precise way in which these position measurements were taken).

In the method, it is assumed that there are a quantity of position measurements $z^a = \{z_i^a\}_{i=1}^{N}$ whose errors behave according to equation (3), and a quantity of position measurements $z^w = \{z_i^w\}_{i=1}^{M}$ whose errors behave according to equation (1). Position measurements $z^a = \{z_i^a\}_{i=1}^{N}$ are for example provided by the first positioning system 14. The position measurements $z^w = \{z_i^w\}_{i=1}^{M}$ are for example provided by the second positioning system 15. For reasons of clarity, it is assumed that these measurements are within the same time period, and the i-th measurement describes the same point in time for both positioning systems. This may for example be achieved by a simple preliminary processing by means of buffering and interpolation. In addition, it is assumed that all position measurements may be clearly assigned to one of two quantities, $z^a$ or $z^w$. In practice, these are frequently measured by different positioning systems and may therefore differ slightly.

An autocorrelation model of the autocorrelated error components is to be determined for the desired error decorrelation. Since the position measurements are normally discrete over time, a discrete autocorrelation model of order A may be assumed for the position errors of position measurements $z_i^a$. In particular, the model order A and the corresponding autocorrelation coefficient $Y_j$ are to be determined.

The order A of the autocorrelation model may be determined with the assistance of a previously performed autocorrelation analysis, a so-called off-line autocorrelation analysis. In the off-line autocorrelation analysis, a data set with position measurements $z_i^a$ is recorded for this. Moreover, a data set with reference position measurements is also recorded during the same time period. The error $e_i^a$ is determined at each point in time over the difference between the reference position measurements and $z_i^a$. This yields a temporal sequence of the position error. Finally, the autocorrelation function of $e^a$ is analyzed. The model order A is for example determined from the largest index of the autocorrelation coefficient whose order of magnitude deviates significantly from zero.

On the basis of the model order A, the autoregressive model of the corresponding order may be determined for the time sequence of the position error $e^a$. Various methods are known in the literature for this. The simplest off-line method is to use the already calculated autocorrelation coefficient for $Y_j$. Alternatively, a method may be used online that for example is based on the Yule-Walker equations, the method of the least square, or the Burg method.

Figure 2:
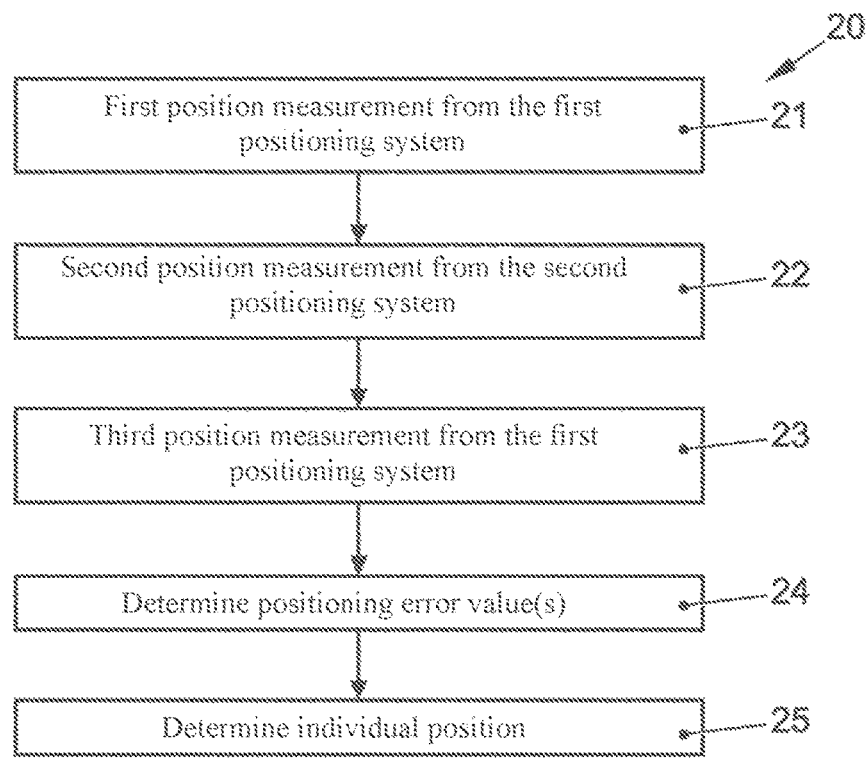
FIG. 2 schematically shows method steps of a method according to an embodiment.

With reference to FIG. 2, a method 20 is be described below which uses position measurements from the first positioning system 14 and position measurements from the second positioning system 15.

Initially, a sufficient quantity of first position measurements $z_i^a$ from the first positioning system 14 is buffered in step 21. A sufficient quantity of second position measurements $z_i^w$ from the second positioning system 15 is buffered in step 22. A number A (=order of the autocorrelation model) from the first position measurements and second position measurements is sufficient. Finally, a third position measurement $z_i^a$ from the first positioning system 14 is detected at the current point in time in step 23. It should be noted that the first position measurements and the second position measurements preceded the third position measurement in time.

For each prior point in time i, an estimation $\hat{e}_i^a$ is calculated of the position error $e_i^a$ of the position measurement $z_i^a$ from the position measurements $z_i^a$ and $z_i^w$ in step 24.

$$\hat{e}_i^a = z_i^a - z_i^w \tag{5}$$

From the following equations (6) and (7), it can be seen that the estimation $\hat{e}_i^a$ of the position error $e_i^a$ corresponds to the difference between the autocorrelated position error $e_i^a$ of the respective first position measurement and the position error $e_i^w$ of the respective second position measurement.

$$\hat{e}_i^a = (p_i + e_i^a) - (p_i + e_i^w) \tag{6}$$

$$= e_i^a - e_i^w \tag{7}$$

A number of A position error estimations $\hat{e}_i^a$ is also buffered.

Under the assumption that the errors in the two measurements do not correlate with each other, the error estimations according to $\hat{e}_i^a \sim N(0, \Sigma^a + \Sigma^w)$ therefore behave less autocorrelated than the original position measurement $z_i^a$.

The buffered A position error estimates may be used in step 25 in order to determine an improved estimation of position $c_i^a$. For this, the autocorrelation components of the position error may be subtracted from the current determined third position measurement $z_i^a$ according to the following equation:

$$c_i^a = z_i^a - \sum_{j=1}^{A} \gamma_j \hat{e}_{i-j}^a \tag{8}$$

The following equations (9) to (14) show that the position errors of this estimation $c_i^a - p_i$ (from the equation 14) may be modeled by means of white noise, and equation (15) applies.

$$c_i^a = p_i + e_i^a - \sum_{j=1}^{A} \gamma_j \hat{e}_{i-j}^a \tag{9}$$

$$c_i^a = p_i + \sum_{j=1}^{A} \gamma_j e_{i-j}^a + v_i^a - \sum_{j=1}^{A} \gamma_j \hat{e}_{i-j}^a \tag{10}$$

$$c_i^a = p_i + \sum_{j=1}^{A} \gamma_j (e_{i-j}^a - \hat{e}_{i-j}^a) + v_i^a \tag{11}$$

$$c_i^a = p_i + \sum_{j=1}^{A} \gamma_j (e_{i-j}^a - e_{i-j}^a + e_{i-j}^w) + v_i^a \tag{12}$$

$$c_i^a = p_i + \sum_{j=1}^{A} \gamma_j e_{i-j}^w + v_i^a \tag{13}$$

$$c_i^a = p_i + \sum_{j=1}^{A} \gamma_j e_{i-j}^w + v_i^a \tag{14}$$

$$c_i^a - p_i \sim N(0, \Sigma_i^a + \sum_{j=1}^{A} \gamma_j^2 \Sigma_{i-j}^w) \tag{15}$$

In summary, a method for decorrelation of position errors is provided. Herein, a quantity of position measurements whose errors are autocorrelated is compared with a quantity of position measurements whose errors are determined by white noise. From this a position $c_i^a$ is determined which is only distorted by white noise.

Figure 3:
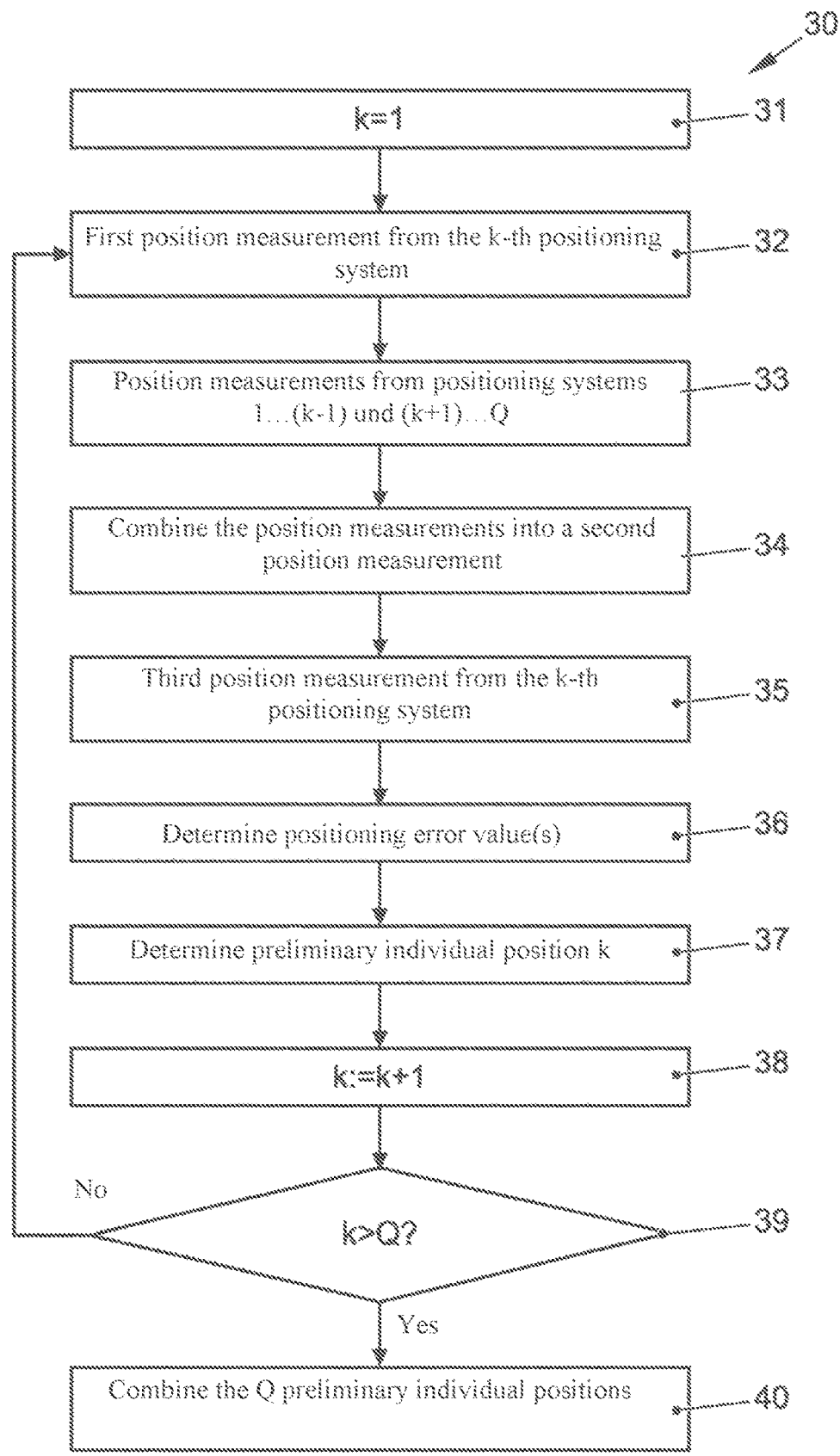
FIG. 3 schematically shows method steps of a method according to another embodiment.

With reference to FIG. 3, a method 30 is described that may be used when at least three positioning systems 14-16 are available. The position measurements from the three positioning systems 14-16 may suffer from any time-correlated errors or time-uncorrelated errors. There is however no correlation between the disturbances of the different positioning systems 14-16. The method is based on the method described with reference to FIG. 2. The at least three positioning systems 14-16 provide position measurements at certain points in time i as was described above with reference to FIG. 2. The number of positioning systems will be termed Q in the following.

Some steps in the method (steps 32-39) are run several times, for example as frequently as positioning systems exist, i.e. Q times, for example. Since the use of the different positioning systems 14-16 changes during the different runs of the method, the positioning systems 14-16 are numbered from 1 to Q.

In step 31, a control variable k is set to value 1. As can be seen from the additional description of the method, the control variable k from 1 to Q may be incremented in Q runs of the method.

A sufficient quantity of first position measurements from the k-th positioning system is buffered in step 32. A sufficient quantity of position measurements from the other positioning systems is buffered in step 33. The other positioning systems comprise all positioning systems with the exception of the k-th positioning system. In step 34, the position measurements of the other positioning systems are fused into corresponding second position measurements. For this, corresponding position measurements from the other positioning systems are fused into a corresponding second position measurement at each measuring point in time. A number A (=order of the autocorrelation model of the k-th positioning system) from the first position measurements and second position measurements is sufficient.

Finally, a third position measurement from the k-th positioning system is detected at the current point in time in step 35. It should be noted that the first position measurements and the second position measurements preceded the third position measurement in time.

As described above with reference to step 24 (FIG. 2), an estimation of the position error of the third position measurement is determined in step 36, and a corresponding preliminary individual position k is determined in step 37. The preliminary individual position may be determined in the same manner as the individual position in step 25 (FIG. 2).

In step 38, the control variable k is incremented by one, and the method is continued starting with step 32 until k is greater than Q (step 39). Overall, Q preliminary individual positions are determined. In step 40, the Q preliminary individual positions are combined into a fused individual position. The error term of the fused individual position may have a higher temporal correlation than the maximum temporal error correlation beyond the Q preliminary individual positions. This is because the error terms of the different individual positions do not have any correlation among each other.

REFERENCE NUMBER LIST

10 Vehicle
11 Device
12 Interface
13 Processor
14 First positioning system
15,16 Second positioning system
20 Method
21-25 Step
30 Method
31-40 Step The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for estimating an individual position that comprises:
   providing at least one first position measurement from a first positioning system,
   providing at least one second position measurement from at least one second positioning system,
   providing a third position measurement from the first positioning system that temporally follows the first and second position measurement, and
   estimating the individual position depending on at least the third position measurement and at least one position error value that is determined on the basis of at least one first position measurement and the at least one second position measurement; wherein the method furthermore comprises:
   providing an autocorrelation order A for position measurements by the first positioning system; wherein
   the individual position is estimated on the basis of at least the third position measurement and A position error values that are determined on the basis of A first position measurements and A second position measurements.

2. The method according to claim 1, wherein a position error value comprises a differential value between a first position measurement and a second position measurement.

3. A device that comprises:
   an interface that is configured to receive position measurements from one first positioning system and position measurements from at least one second positioning system,
   at least one processor that is configured to perform the following steps:
      providing at least one first position measurement from the first positioning system,
      providing at least one second position measurement from the at least one second positioning system,
      providing a third position measurement from the first positioning system that temporally follows the first and second position measurement,
      providing an autocorrelation order A for position measurements by the first positioning system, and
      estimating the individual position depending on at least the third position measurement and at least one position error value that is determined on the basis of at least one first position measurement and the at least one second position measurement; wherein
   the individual position is estimated on the basis of at least the third position measurement and A position error values that are determined on the basis of A first position measurements and A second position measurements.

4. The method according to claim 1, wherein the method furthermore comprises:
   providing A autocorrelation coefficients, and
   the individual position is moreover estimated on the basis of at least the A autocorrelation coefficients.

5. The method according to claim 4, wherein the individual position $c_i^a$ is estimated according to the following equation:

$$c_i^a = z_i^a - \sum_{j=1}^{A} \gamma_j (z_{i-j}^a - z_{i-j}^w)$$

with:
   the third position measurement $z_i^a$ time i;
   the A autocorrelation coefficient $y_j$;
   the A first position measurements $z_{i-j}^a$ at points in time i-1 to i-A; and
   the A second position measurements $z_{i-j}^w$ at points in time i-1 to i-A.

6. The method according to claim 1, wherein the third position measurement, the at least one first position measurement, and the at least one second position measurement each comprise absolute position measurements that indicate an absolute geographic position.

7. The method according to claim 1, wherein the third position measurement, the at least one first position measurement, and the at least one second position measurement each comprise relative position measurements that indicate a relative geographic position with regard to a respective preceding position measurement.

8. A method for estimating an individual position using Q position-determining sources with Q being greater than or equal to 3, which comprises:
   estimating a respective preliminary individual position for each k of 1 to Q according to the method of claim 1 with:
      the position-determining source k as the first positioning system, and
      the positioning determining sources 1 to Q without k as the at least one second positioning system in that the at least one second position measurement is determined by combining position measurements of the position-determining sources 1 to Q without k, and
   combining the Q preliminary individual positions into the individual position.

* * * * *